US012764602B2

(12) United States Patent
Malboubi et al.

(10) Patent No.: US 12,764,602 B2
(45) Date of Patent: Oct. 13, 2026

(54) METHODS, SYSTEMS, AND DEVICES FOR ENABLING MOBILE NETWORKS TO SELECT MOBILE NETWORK RESOURCES BASED ON MULTIPLE DESCRIPTION CODING OF MEDIA CONTENT

(71) Applicant: AT&T Intellectual Property I, L.P., Atlanta, GA (US)

(72) Inventors: Mehdi Malboubi, San Ramon, CA (US); Raghvendra Savoor, Walnut Creek, CA (US); Weihua Ye, Chicago, IL (US); Hessam Moeini, Frisco, TX (US); Michael R. Albrecht, Dallas, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 319 days.

(21) Appl. No.: 18/657,000

(22) Filed: May 7, 2024

(65) Prior Publication Data

US 2025/0351003 A1 Nov. 13, 2025

(51) Int. Cl.
*H04W 28/086* (2023.01)
*H04W 24/02* (2009.01)

(52) U.S. Cl.
CPC ....... *H04W 28/0861* (2023.05); *H04W 24/02* (2013.01)

(58) Field of Classification Search
CPC .......................... H04W 28/0861; H04W 24/02
USPC .......................................................... 370/329
See application file for complete search history.

(56) References Cited

U.S. PATENT DOCUMENTS 10,318,543 B1 * 6/2019 Sharifi .............. G06F 16/24573
2016/0295247 A1 * 10/2016 Carney Landow .... H04N 21/84
2018/0316974 A1 * 11/2018 Kardatzke ........... H04N 21/482

* cited by examiner

*Primary Examiner* — Huy C Ho
(74) *Attorney, Agent, or Firm* — Guntin & Gust, PLC; Atanu Das

(57) ABSTRACT

Aspects of the subject disclosure may include, for example, obtaining media content from a media content source over a mobile communication network, determining that the media content comprises a first portion of the media content and a second portion of the media content, determining a first mobile network resource for communicating the first portion of the media content utilizing a machine learning and artificial intelligence application, and determining a second mobile network resource for communicating the second portion of the media content utilizing the machine learning and artificial intelligence application. Further embodiments can include providing the first portion of the media content to a communication device utilizing the first mobile network resource, and providing the second portion of the media content to the communications device utilizing the second mobile network resource. Other embodiments are disclosed.

20 Claims, 13 Drawing Sheets

210

100

200

205

210

215

220

225

230

235

300

600

METHODS, SYSTEMS, AND DEVICES FOR ENABLING MOBILE NETWORKS TO SELECT MOBILE NETWORK RESOURCES BASED ON MULTIPLE DESCRIPTION CODING OF MEDIA CONTENT

FIELD OF THE DISCLOSURE

The subject disclosure relates to methods, systems, and devices for enabling mobile networks to select mobile network resources based on multiple description coding of media content.

BACKGROUND

In many modern communication systems/networks and in the presence of hard-resource constraints (e.g. limited power, bandwidth, and compute resources), the separation between source coding and channel coding is not optimal. Traditionally, to resolve this issue, joint source-channel coding techniques are used. Examples of those techniques are the use of different Forward Error Control (FEC) Codes, Automatic Repeat Request (ARQ) schemes, modulations, Quality of Services (QoS) classes, and network routing paths.

Another class of joint source channel coding scheme, for transmission over noisy channels with loss/erasure, is Multiple Description Coding (MDC) media content, in which multiple descriptions of the source media content, with same/different importance, are transmitted over different paths from the source. In Multiple Description Coding (MDC), source media content (e.g., media content such as an image or a video) is partitioned or portioned into multiple descriptions. Each description has its own rate (e.g., bit rate) which is an indication of the capacity required for transmitting that description and the quality of the retrieved media content at the receiver/user-side. In multiple description coding, several descriptions of the source media content are produced such that various reconstruction qualities are obtained from different subsets of the descriptions. If a subset of descriptions is received at the receiver (note that due to noise, channel-imperfections and other issues some of the descriptions may be lost), then content with an acceptable quality is reconstructed. But if all descriptions are received, content with high quality can be reconstructed.

BRIEF DESCRIPTION OF THE DRAWINGS

Reference will now be made to the accompanying drawings, which are not necessarily drawn to scale, and wherein.

DETAILED DESCRIPTION

Figure 1:
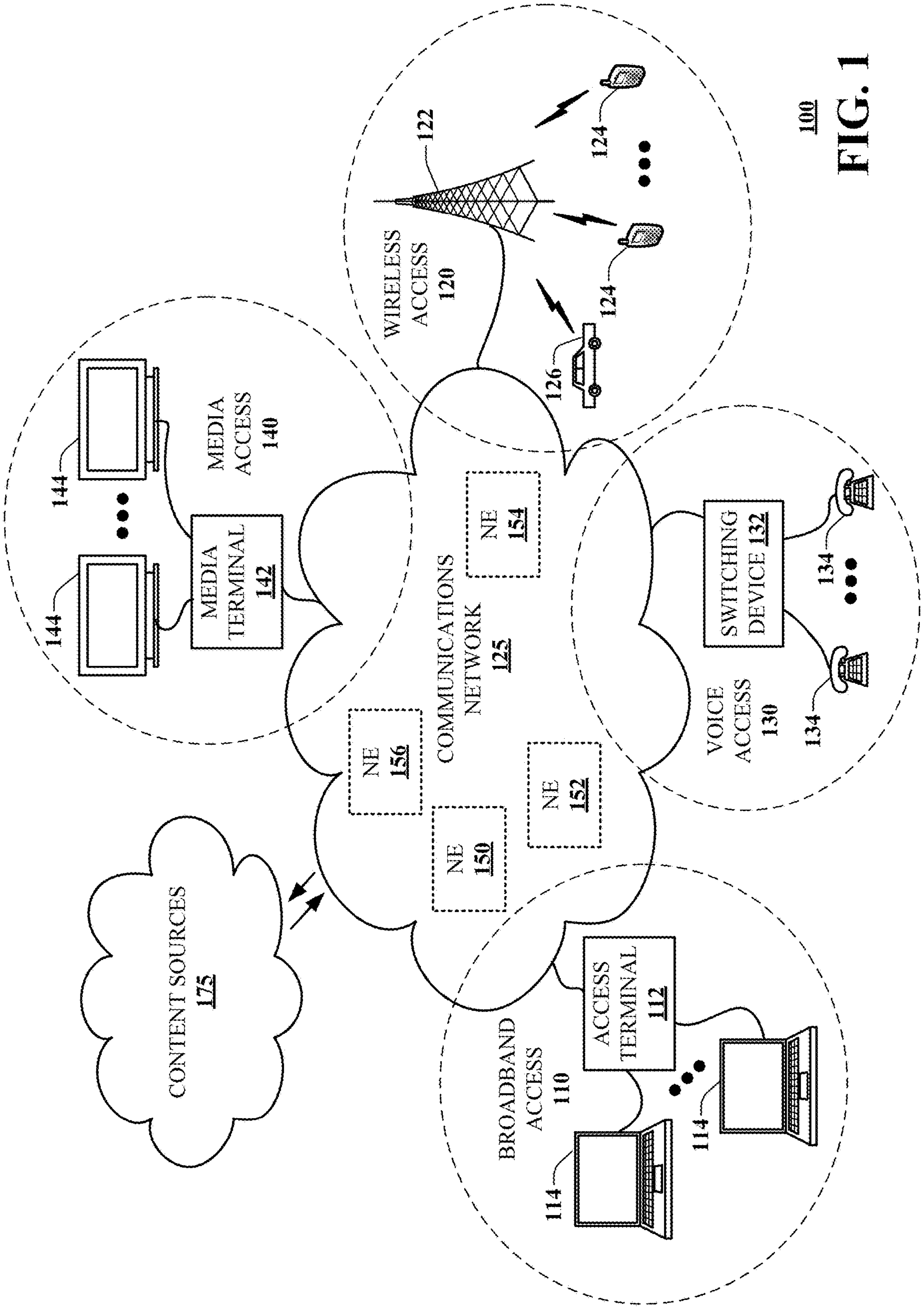
FIG. 1 is a block diagram illustrating an exemplary, non-limiting embodiment of a communications network in accordance with various aspects described herein.

The subject disclosure describes, among other things, illustrative embodiments for obtaining media content from a media content source over a mobile communication network, determining that the media content comprises a first portion of the media content and a second portion of the media content, determining a first mobile network resource for communicating the first portion of the media content utilizing a machine learning and artificial intelligence application, and determining a second mobile network resource for communicating the second portion of the media content utilizing the machine learning and artificial intelligence application. Further embodiments can include providing the first portion of the media content to a communication device utilizing the first mobile network resource, and providing the second portion of the media content to the communications device utilizing the second mobile network resource. Other embodiments are described in the subject disclosure.

One or more aspects of the subject disclosure include a device, comprising a processing system including a processor, and a memory that stores executable instructions that, when executed by the processing system, facilitate performance of operations. The operations can comprise obtaining media content from a media content source over a mobile communication network, determining that the media content comprises a first portion of the media content and a second portion of the media content, determining a first mobile network resource for communicating the first portion of the media content utilizing a machine learning and artificial intelligence application, and determining a second mobile network resource for communicating the second portion of the media content utilizing the machine learning and artificial intelligence application. Further operations can comprise providing the first portion of the media content to a communication device utilizing the first mobile network resource, and providing the second portion of the media content to the communications device utilizing the second mobile network resource.

One or more aspects of the subject disclosure include a non-transitory machine-readable medium, comprising executable instructions that, when executed by a processing system including a processor, facilitate performance of operations. The operations can comprise obtaining media content from a media content source over a mobile communication network, determining that the media content comprises a first portion of the media content encoded according to a first description and a second portion of the media content encoded according to a second description, determining a first mobile network resource for communicating the first portion of the media content utilizing a machine learning and artificial intelligence application, and determining a second mobile network resource for communicating the second portion of the media content utilizing the machine learning and artificial intelligence application. Further operations can comprise providing the first portion of the media content to a communication device utilizing the first mobile network resource, and providing the second portion of the media content to the communications device utilizing the second mobile network resource.

One or more aspects of the subject disclosure include a method. The method can comprise obtaining, by a processing system including a processor, media content from a media content source over a mobile communication network, and determining, by the processing system, that the media content comprises a first portion of the media content encoded according to a base layer description and a second portion of the media content encoded according to an enhancement layer description. Further, the method can comprise determining, by the processing system, a first mobile network resource for communicating the first portion of the media content utilizing a machine learning and artificial intelligence application, and determining, by the processing system, a second mobile network resource for communicating the second portion of the media content utilizing the machine learning and artificial intelligence application. In addition, the method can comprise providing, by the processing system, the first portion of the media content to a communication device utilizing the first mobile network resource, and providing, by the processing system, the second portion of the media content to the communications device utilizing the second mobile network resource.

Referring now to FIG. 1, a block diagram is shown illustrating an example, non-limiting embodiment of a system 100 in accordance with various aspects described herein. For example, system 100 can facilitate in whole or in part enabling mobile networks to select mobile network resources based on multiple description coding of media content. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIGS. 2A-2G are block diagrams illustrating example, non-limiting embodiments of a system functioning within the communication network of FIG. 1 in accordance with various aspects described herein. Demand for higher data rates with high quality of service (QOS) or quality of experience (QoE) is always increasing, which is difficult to maintain due to the limited amount of mobile network resources and the existence of spatial-temporal coverage holes in mobile networks. On the other hand, the current implementation of LTE and 5G provides huge non-heterogeneity and diverse communication channels between sources and destinations via carrier aggregation, beamforming and the use of multiple coexisting technologies (e.g. LTE and 5G). Accordingly, delivering media content and providing services to customers with high QoS/QoE in highly dynamic LTE/5G network environments needs intelligent and real-time communication strategies that take advantage the existing heterogeneity and diversity of the underlying communication infrastructure in an optimal way.

One or more embodiments utilize the diversity of the underlying mobile communication network infrastructure, differentiate between the transmissions at the source, and send different portions of source media content over different channels via Multiple Equal/Unequal Importance Communication strategy. The main goal is the effective usage of different existing mobile communication network resources, by the optimal allocation and protection of source media content, to increase QoS, coverage, and the speed of communication, in diverse environments. This is significant in many current mobile applications that need better QoS with high throughput and lower latency. In addition, one or more embodiments include an intelligent framework, that can be instantiated at the edges of the mobile network, where mobile network operators can provide real-time information that internal/external users (e.g., content delivery companies such as streaming services or social media networks) can use for the optimal content delivery. Overall, this framework optimizes the distribution of contents, provides better QoS/QoE for customers, reduces the latency in content delivery, reduces the intra/inter cell interference, and lowers the contention for mobile network resources among users.

Figure 2A:
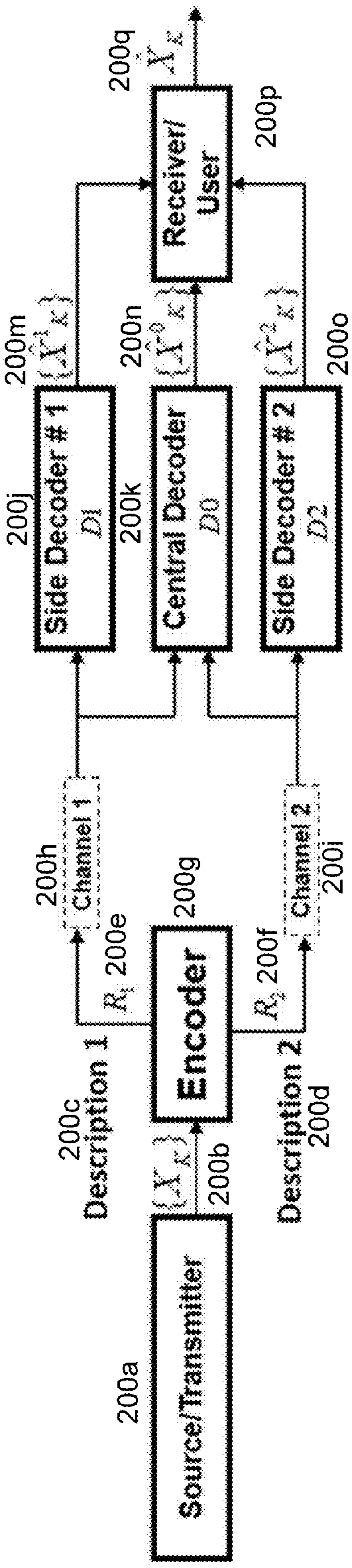
FIGS. 2A-2G are block diagrams illustrating example, non-limiting embodiments of a system functioning within the communication network of FIG. 1 in accordance with various aspects described herein.

Referring to FIG. 2A, one or more embodiments show the general block-diagram of a system 200 that illustrates how MDC works where two descriptions of source media content from a source (transmitter) 200*a*, sequence $\{X_k\}$ 200*b* for k=1, 2, 3, . . . , K), are transmitted over a first channel 200*h* at a rate R1 200*e* and over a second channel 200*i* at a rate R2 200*f*. A description is a portion of a media content in which it may be used to reconstruct the media content after transmission over a mobile network. As more descriptions of the media content is used to reconstruct the media content, the better the quality of the reconstructed media content. Prior to transmission, the source media content $\{X_k\}$ 200*b* is encoded into a first description 200*c* and a second description 200*d* by encoder 200*g*. The source media content can be encoded by a source media content system that includes one or more computer systems and/or databases.

In one or more embodiments, if only one of the descriptions are received at the receiver (which can be a communication device (e.g., mobile phone, mobile device, table computer, etc.) associated with a user), then the side decoder (D1 or D2) reconstructs $$\hat{X}_K^1 \text{ or } \hat{X}_K^2$$

with an acceptable quality as $\hat{X}_K$ (the final reconstructed media content). That is, if only the first description 200*c* is received (and not the second description 200*d*), then side decoder 200*j* decodes the first description 200*c* into reconstructed media content $$\hat{X}_K^1$$

for receiver 200*p*. Further, if only the second description 200*d* is received (and not the first description 200*c*), then side decoder 200*l* decodes the second description 200*d* into reconstructed media content $$\hat{X}_K^2$$

for receiver 200*p*. However, if both the first description 200*c* and second description 200*d* are received, then the central decoder 200*k* reconstruct media content $$\hat{X}_K^0$$

with higher quality as $\hat{X}_K$ 200*q*. In some embodiments of implementing MDC, the descriptions are equally important and independent and there is no hierarchy of descriptions.

Figure 2B:
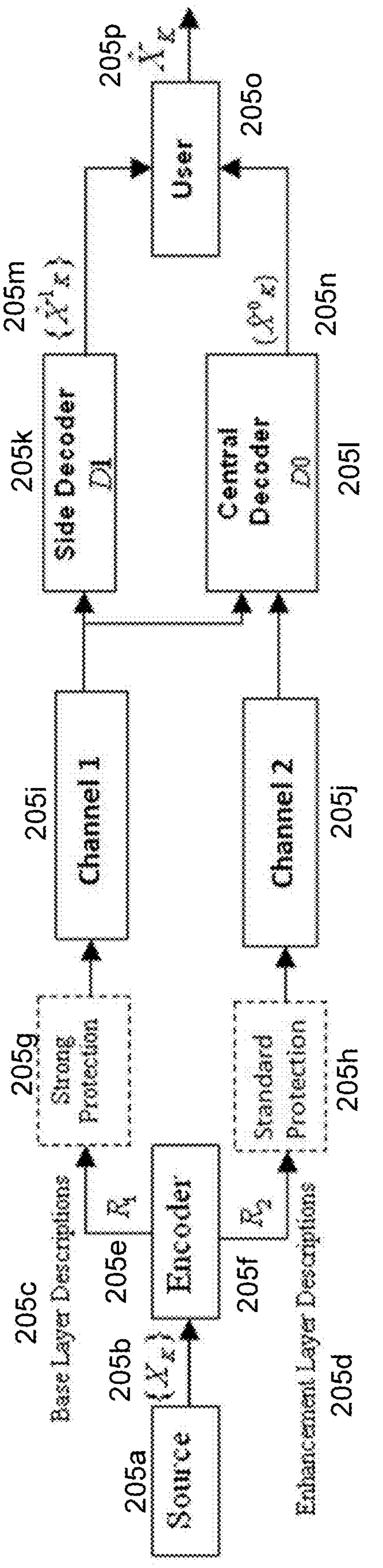

Referring to FIG. 2B, in one or more embodiments, system 205*f*, unlike MDC where each description of source media content has almost similar importance, in Unequal Importance Communication (UIC), multiple descriptions with different levels of importance are generated and they are transmitted over different channels/paths/networks with different levels of protections. That is, a source (transmitter) 205*a* transmits source media content $\hat{X}_K$ 205*b* to an encoder 205*f* that generates a base layer description 205*c* of the source media content $\hat{X}_K$ at rate R1 205*e* and an enhancement layer description 205*d* of the source media content $\hat{X}_K$ at rate R2 205*f*. The source media content can be encoded by a source media content system that includes one or more computer systems and/or databases. Further, prior to transmitting the base layer description 205*c* over a first channel 205*i*, the source 205*a* (transmitter) provides it with strong protection 205*g* (e.g., error protection) and prior to transmitting the enhancement layer description 205*d* over a second channel 205*j*, the source 205*a* (transmitter) provides it with standard protection 205*h* (e.g., error protection).

In one or more embodiments, when important descriptions (e.g., base layer description 205*c*) are received as content with acceptable quality $$(\hat{X}_K^1)$$

205*m* is reconstructed using side decoder D1 205*k* as ÅR 205*p* for the user 205*o* (receiver-which can be a communication device (e.g., mobile phone, mobile device, table computer, etc.) associated with a user). When enhancement layer description 205*d* is received, media content with high quality $$\hat{X}_K^0$$

205*n* is reconstructed as $\hat{X}_K$ 205*p* by central decoder 2051. The base layers can also be strongly protected using a different mechanism, for example more powerful forward error control coding, higher transmitted power, or transmitting via a narrower beam.

Figure 2C:
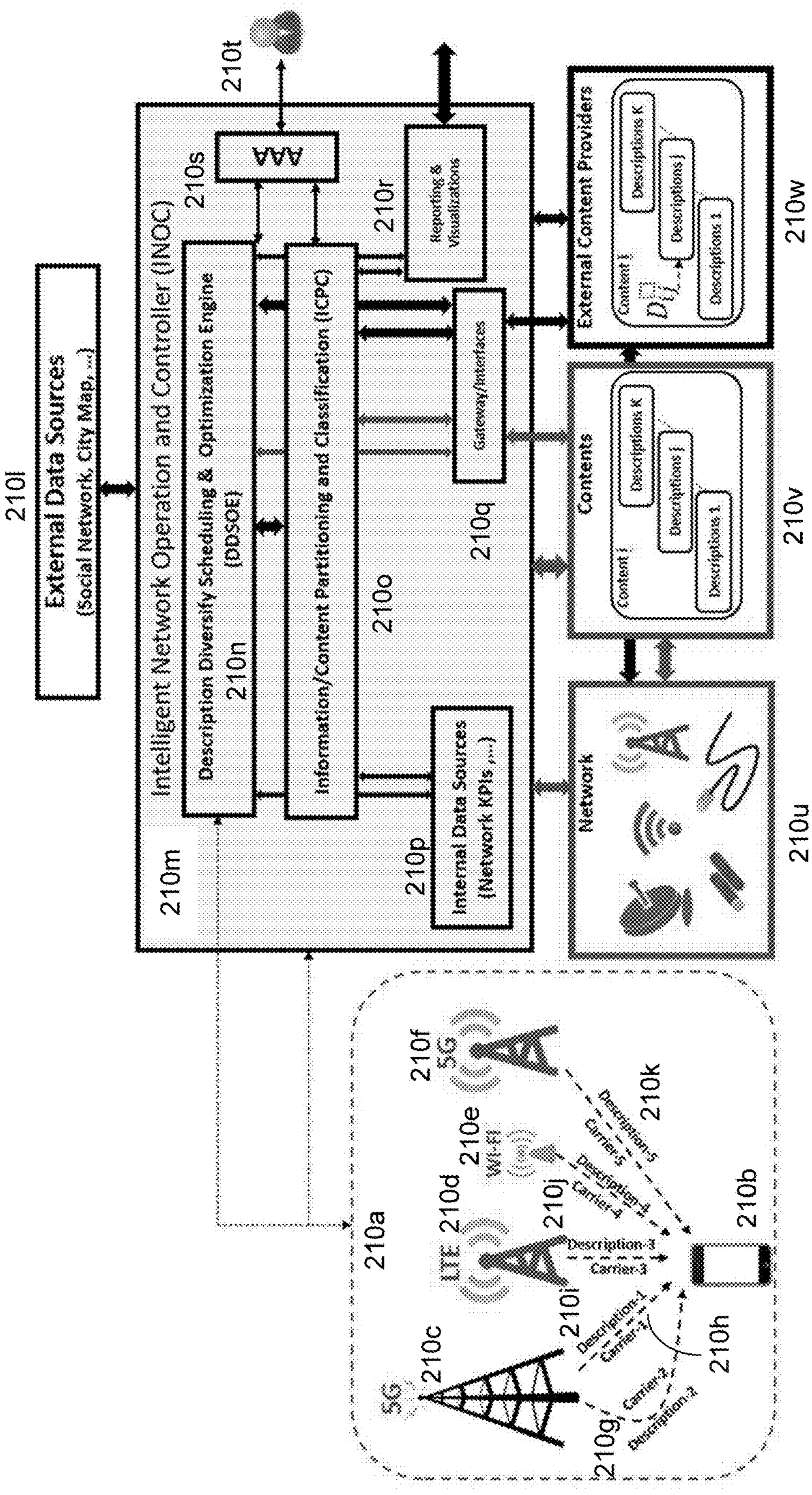

Referring to FIG. 2C, in one or more embodiments, a system 210 utilizes LTE/5G capabilities (e.g. carrier aggregation, beamforming, radio resource partitioning, and coexistence of LTE/5G) to diversify transmitting multiple descriptions of source media content, with same or different importance/rates and with different levels of protections, to the destination. Further embodiments of system 210 provide required information for internal/external customers to facilitate implementing such capabilities. Additional embodiments include an implementation using 3GPP and Open Radio Access Network (RAN)/RAN intelligent controller (RIC) components that facilitate the implementation and adoption of the MDC framework over different mobile network resources utilizing different technologies.

In one or more embodiments, system 210 includes a Description Diversify Scheduling and Optimization Engine (DDSOE) 210*n* that optimizes the transmission of descriptions of source media content received from external data sources 2101, internal content providers 210*v*, and/or external content providers 210*w* over different physical/virtual channels in near real-time. The DDSOE 210*n* is part of the Intelligent Network Operation and Controller (INOC) 210*m* where it monitors and optimizes the operation of a portion of the mobile network. The INOC 210*m* can be implemented by one or more network devices. Depending on the application, the descriptions may have almost equal importance or they may have different importance. The DDSOE 210*n* can use a variety of constrained/unconstrained/heuristic optimization techniques and Machine-Learning (ML)/Artificial-Intelligence (AI) methods (e.g., supervised/unsupervised learning, deep-learning or reinforcement learning techniques) to assign mobile network resources, schedule and transmit multiple descriptions over different physical/virtual channels in a timely-manner. Examples of channels are different carriers, different beams, transferring via different technologies (e.g., LTE and 5G, WiFi, etc.) and using different multiple access codes (e.g., in Code Division Multiple Access (CDMA) technologies). In one embodiment, the system 210 can be implemented as an added functionalities to the RAN Intelligent Controller (RIC) and Open-RAN technologies in mobile communication networks (See FIG. 2F). The DDOSE 210*n* is also equipped with required pre/post processing (e.g., filtering) that facilitates the optimal transmission of the descriptions.

One or more embodiments of system 210 can show LTE/5G networks in which different equal/unequal importance descriptions are transferred on different carriers via carrier aggregation capability in LTE/5G networks. In such embodiments, the DDSOE 210*n* uses different network key performance indicators (KPIs) as well as internal data sources 210*p* and external data sources 210*u* to build/use intelligent models and optimize scheduling of descriptions over different carriers. In further embodiments and depending on the application, DDSOE 210*n* may transmit the base layer descriptions or subset of descriptions via a carrier with better coverage (e.g., better signal strength/quality) and enhancement layer descriptions or complementary set of descriptions via other carriers. Such embodiments are significant as carrier aggregation is one of the well-implemented technologies in LTE/5G networks and enabling intelligent transmission of different descriptions using carrier aggregation can be effective and efficient as it can: significantly increases the coverage, bandwidth and power efficiency; reduce the delay and cost of communication (note that reducing the latency is important in many 5G applications); and improve the Quality of Experience (QoE) for customers.

In one or more embodiments, the INOC 210*m* can include a group of information/content partitioning and classification (ICPC) software applications 2100, gateway/interfaces 210*q* to the internal content providers 210*v* and the external content providers 210*w*, reporting and validation software applications 210*r*, and authentication, authorization, accounting (AAA) software applications 210*s* that can be accessed by mobile network operator personnel 210*t*. Further, system 210 can include edge network components that include a 5G base station 210*c*, LTE base station 210*d*, WiFi gateway 210e, 5G base station 210*f* that provide a first description 210*h*, a second description 210*g*, a third description 210*i*, a fourth description 210*j*, and a fifth description 210*k* of source media content from the INOC 210*m* to a communication device 210*b* (e.g., user equipment) utilizing carrier aggregation.

Figure 2D:
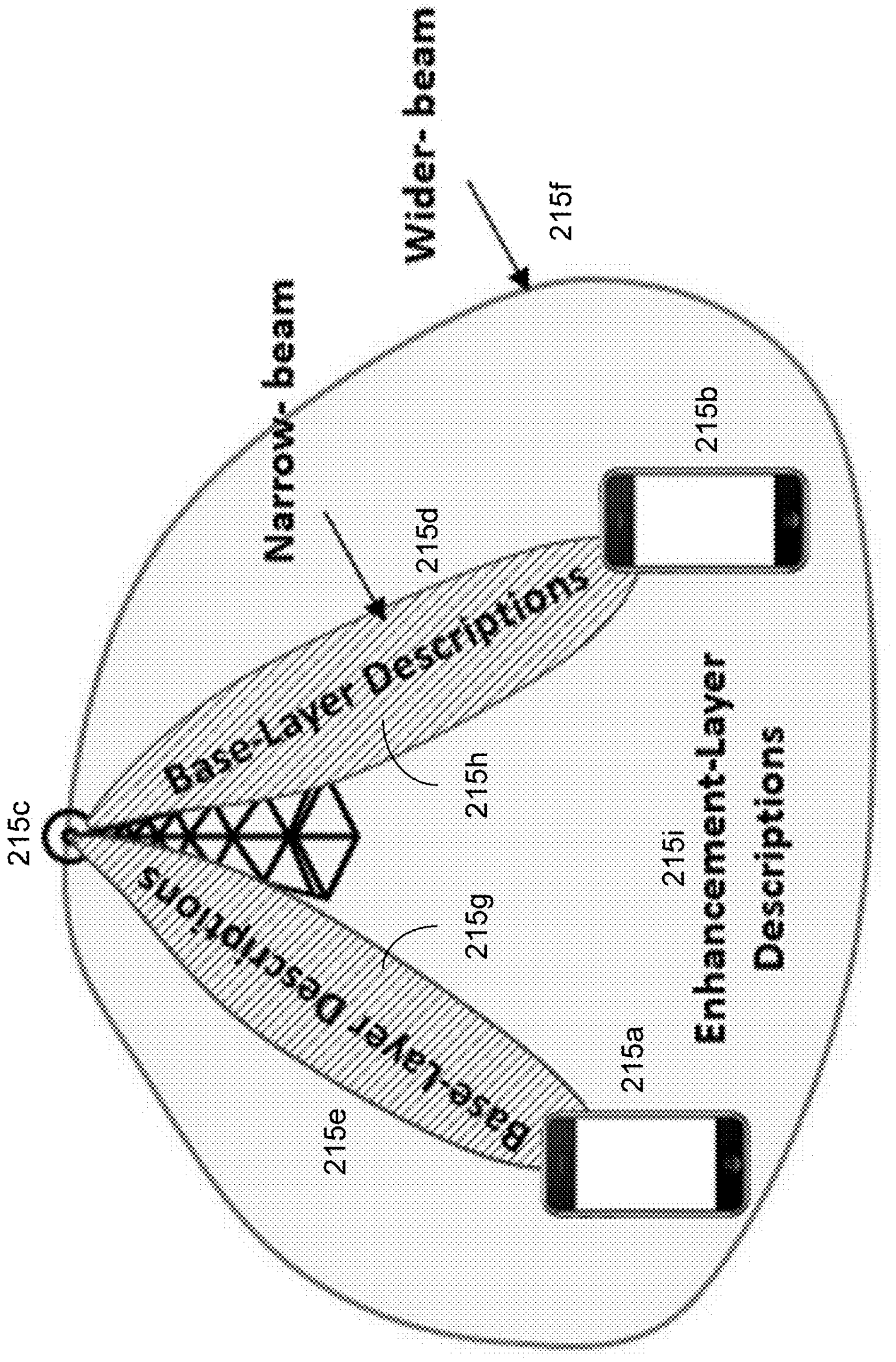

Referring to FIG. 2D, in one or more embodiments, in system 215, the DDSOE can utilize beamforming capability in a 5G mobile network to transmit set of descriptions or first base layer description 215*g* (e.g., the most important part of the source media content) via a first narrow beam 215*e* to a first communication device 215*a* from base station 215*c*. Further, the base station 215*c* can transmit a second base layer description 215*h* via a second narrow beam 215*d* to a second communication device 215*b*. In addition, a complementary set of descriptions or the enhancement layer descriptions 215*i* via a wider beam 215*f* to the first communication device 215*a* and the second communication device 215*b*. Such embodiments use the beam forming capability to distribute a subset of descriptions or the most important descriptions (e.g., first base layer description 215*g* and second base layer description 215*h*) to a larger number of users via their respective communication devices with low latency and with high QoS/QoE. This is important as beamforming resources (e.g., number of antennas/ports and transmitted power) are limited (both at base stations and communication devices) and the optimal utilization of these resources can improve the efficiency of the underlying communication system and the QoE for users. Alternatively, directed beams can distribute a few equally important descriptions over larger number of users via their respective communication devices where the complementary set of descriptions can be transmitted over the regular antennas and more appropriate frequencies.

Figure 2E:
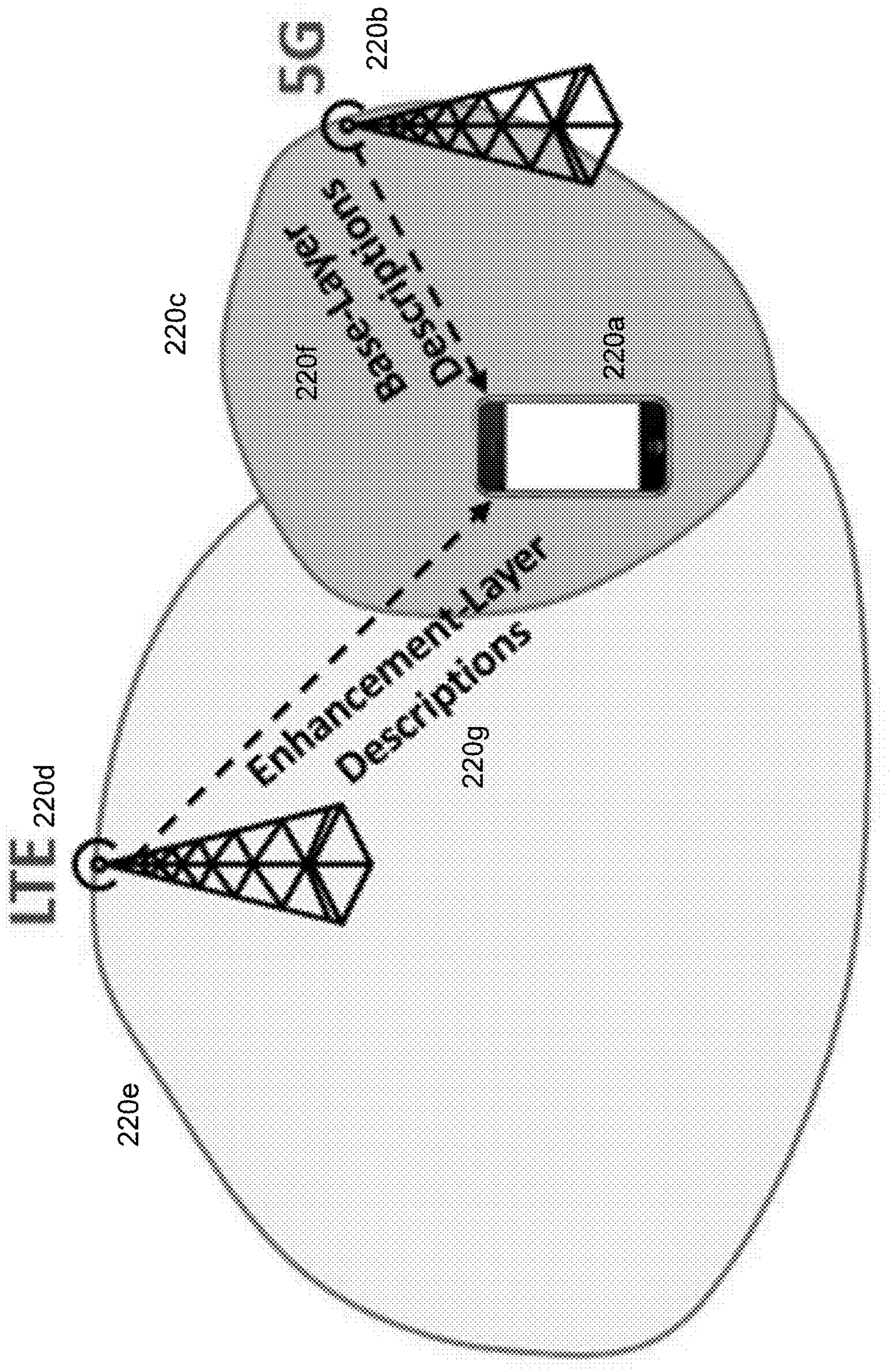

Referring to FIG. 2E, in one or more embodiments, in system 220, the DDSOE may utilize multiple coexistence technologies (e.g., LTE and 5G) for transmitting multiple descriptions with same/different importances and with same/different levels of protections. An example using dual-connectivity has been shown in FIG. 2E, where subset of descriptions or base layer descriptions 220*f* are transmitted via 5G-connectivity 220*c* from base station 220*b* to communication device 220*a* and complementary set of descriptions or enhancement layer descriptions 220*g* are transmitted using LTE-connectivity 220*e* from base station 220*d* to communication device 220*a*. Depending on the application and the position/coverage of communication device, subset of descriptions or the base layer descriptions 220*f* can be transmitted over LTE-connectivity 220 and complementary subset of descriptions or enhancement layer descriptions 220*g* can be transmitted using 5G-connectivity 220*c*. Depending on the application and communication device 220*a* (e.g., mobile phone/tablet/mobile device or desktops) and its location (e.g., inside/outside), descriptions can also be sent over WiFi or wireless-internet or cable/fiber.

In one of more embodiments, set of descriptions on base layer descriptions can be transmitted when the communication device 220*a* is farther from a base station (e.g., based or Timing Advanced) or when communication device 220*a* is not in good coverage (receiving lower signal strength with higher noise and interference). The complementary set of descriptions or enhancement layer descriptions can be transmitted when the communication device 220*a* is closer to the base station or when it is in better coverage. This can significantly reduce the interference at the edge of the cells in mobile networks, reduce the inter-cell interference and improve the coverage and QoE for communication device at the edges of the cells.

In one or more embodiments, portions of media content can be transmitted using a carrier aggregation technique and via different carrier frequencies based on QoS Class Identifier (QCI), packet delay budget and packet loss rates. For example, portions of media content that require lower latencies can be transmitted on a carrier with a better coverage and signal quality based on the position of communication device 220*a* (e.g., determined by timing advance).

In one or more embodiments, any combinations of different available technologies, for example carrier aggregation, beamforming and coexisting technologies, can also be used in enabling transmitting different descriptions via different channels/paths/networks. In one embodiment, reconfigurable parameters in the control plane or data plane of standards (e.g. DMRS mapping times) can be used for differentiating the transmission of descriptions with different importance based on the channel condition associated with communication device 220*a* (e.g., user equipment) and the needed reliability. In another embodiment, base layer description can contain highly-secured sensitive information (e.g. private/public encryption keys) and transmitted over more reliable channels and enhancement layers can be considered as data payload and transmitted over less reliable channels. Note that recovery of data payload depends on the correct recovery of private/public keys. Also, in assigning the channels/paths/routes to the base layer description and enhancement layers, the quality/reliability of the end-to-end channels/paths/route over the RAN-segment, transport-segment, core-network and the internet may be considered.

In general, the embodiments described herein can be applied for transmitting multiple descriptions in both downlink and uplink channels in mobile networks. On the uplink, however, a mobile network operator can also develop an application that can be installed on communication device 220*a*. Based on the communication device capability, such an application can implement multiple description encoding/decoding techniques required to generate multiple descriptions of a content and facilitate the generation and transmission of multiple descriptions over different channels and using different technologies. Moreover, this application can optionally interact with the DDSOE and coordinate the optimal transmission of multiple descriptions with DDSOC. Developing such an application is important as not all devices may currently support the generation/transmission of multiple descriptions. Developing such an application can also help the mobile network operator to promote its content distribution services with higher QoS/QoE and acquire more customers, which is important in generating revenue for the mobile network operator. Further, the mobile network operator can also license the technology of enabling a device to intelligently generate/transmit multiple descriptions over different channels/technologies in LTE/5G and next generation of mobile networks to device manufacturers.

Descriptions for each media content can be constructed by internal and external content providers and, optionally, based on a set of predefined agreements between the content provider and a mobile network operator. Accordingly, the $i^{th}$ content of an external/internal content provider can be partitioned into K descriptions, denoted by $D_{ij}$ (for j=1, . . . , K) in FIG. 2C. The partition of a media content and generating multiple descriptions can be accomplished by many different techniques. For example, a Discrete-Cosine Transform (DCT) or a Discrete Wavelet Transform (DWT) can be applied to an image/video and subset of DCT/DWT coefficients can be used to construct a description. For example, in an image, the DC coefficient of the DCT of the image has the most important part of the information. System 210 of FIG. 2C, additionally has the capability of constructing descriptions of media content using Information/Content Partitioning and Classification (ICPC) software applications.

The importance of descriptions can be indicated in network packets and it can be used for content classification and differentiating transmissions over different channels. In one embodiment, the ICPC software applications use different headers of IP4/IP6 packets to indicate/classify the importance of the contents/packets/flows (e.g., ICPC assigns different weights to descriptions where higher weight values shows higher importance). More importantly, the ICPC can use the Differentiated Services Code Point (DSCP) field in IP4/IP6 packet header for this purpose. In another embodiment, the external/internal content providers can generate and classify the descriptions using different mechanisms, including different headers of IP4/IP6 packets (e.g. DSCP). Accordingly, the DDSOE (See FIG. 2C) receives descriptions and their importances from ICPC or internal/external content providers and optimally transmit different equally or unequally important descriptions/packets/flows over different channels/technologies.

Note that, the process of generation multiple descriptions of media content and classifying them with different characteristics and bit rates can be done in an offline or online manner. In offline manner, descriptions can be previously prepared and stored. But in the online manner, the ICPC software applications or content providers produce descriptions with different importance with more real-time interactions with DDOSE. Further, the DDOSE can provide and predict auxiliary resource-assignment/scheduling information for users and content providers, indicating that, for example: what resources (e.g. bandwidths, carriers, antenna-ports, dual-connectivity capability) are available at which cell and at what time; and what bit rates are supported at what time, in which cells and with what quality (e.g. indicated by Channel Quality Indicator in LTE/5G networks). Accordingly, the content providers and user equipment can use this information to optimally schedule the transmission of descriptions. For example, they can determine/predict which description(s) is (are) required at what time and where (e.g. which edge-location close to which cell) and in what order.

The DDOSE can use different internal/external data sources and it can utilize a variety of optimization techniques and ML/AI methods to build and predict the optimal scheduling solutions. The DDOSE can optimize different cost functions in its optimal description scheduling, such as minimizing the latency of media content distribution to user equipment or among multiple user equipment, or maximizing the QoS/QoE for a set of customers via, for instance, maximizing the number of received descriptions. In another embodiment, the DDOSE can use the characteristics of previously generated descriptions of media content (e.g., description importance, or its size/bit rate) to optimally schedule the transmission of descriptions. The interactions between the INOC/DDOSE/ICPC software applications and the content providers can be created/facilitated via different mechanisms including the use of different interfaces and APIs. Embodiments of the DDOSE and ICPC can be instantiated at the edge of the mobile network to reduce the latency between content providers and the INOC.

An internal/external user (or application) can access system 210 in FIG. 2C after appropriate authentication and authorization via the AAA (Authentication, Authorization and Accounting) software application. Required reporting information can be provided for users via the Reporting/Visualizations software application after applying required post-processing such as anonymization.

Figure 2F:
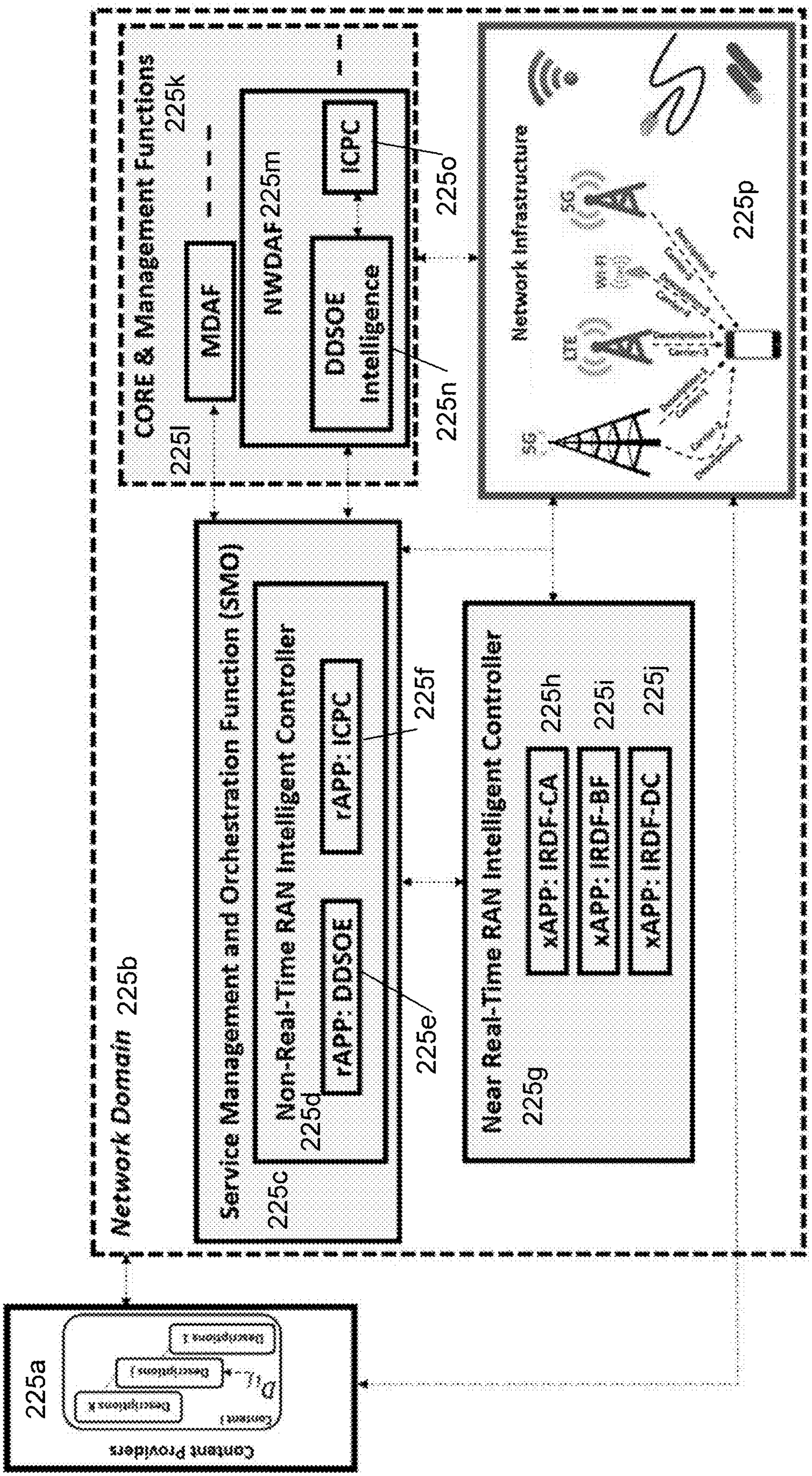

Referring to FIG. 2F, in one or more embodiments, system 225 facilitates and speeds up the implementation of MDC in a more efficient way. Further, system 225 comprises one or more network devices to implement the functions described herein. System 225 includes embodiments of the INOC using currently defined 3GPP, Open-RAN, and RIC components. In some embodiments, Network Data Analytics Function (NWDAF) **225*m* provides data collection, storage and analysis services. The NWDAF 225*m* can also be used to build and adaptively update the intelligence (inference logic or ML model) of the previously explained Description Diversify Scheduling and Optimization Engine (DDOSE) 225*n*. The Information/Content Partitioning and Classification (ICPC) 225*o* can also be built as part of NWDAF 225*m*. The Management Data Analytics Function (MDAF) 2251** provides services for collecting data from across the network and publishing it to other network management and orchestration modules.

The Service Management and Orchestration (SMO) function **225*c* provides key functionalities for RAN such as work-flow management, cloud/network infrastructure management and ML/AI training and modeling. The RAN (Radio Access Network) Intelligent Controller (RIC) 225*d* provides a platform for running RAN control and optimizations functions. The DDOSE functionality in FIG. 2C can be implemented as a Non-Real-Time RIC Application (e.g., rAPP) 225*e*. The rAPP: DDSOE 225*e* can be developed in different ways. For example: 1) using a pre-defined inference logic for enabling DDSOE functionalities; and 2) by training an ML model which enables DDOSE functionalities, where the ML model can be developed in collaboration with DDSOE-Intelligence 225*n* in NWDAF 225*m*. As described herein, the DDSOE can use different network measurements/KPIs (e.g., cell utilization/congestion metrics and channel quality metrics) to estimate and predict what resources are available when and where, what bit rates are supported and accordingly determine the configuration parameters (e.g. the carriers, beamforming weights, antenna ports, etc.) for the underlying Near-Real-Time RIC Applications (e.g., xAPP). Similarly, and as it was described herein, the ICPC functionalities (e.g., constructing descriptions with different importance and bit rates) can be developed using rAPP: ICPC 225*f* and in collaboration with ICPC 225*o* in NWDAF 225*m***.

System 225 also includes different Intelligent and Real-time Description Forwarding (IRDF) xAPPs including xApp: IRDF-CA **225*h*, xApp: IRDF-BF 225*i*, and xApp: IRDF-DC 225*j*, in the Near-Real-Time RAN Intelligent Controller 225*g* that receive the required intelligence and configuration parameters and packet/flow classification attributes from rAPPs and NWDAF 225*m*, and accordingly, forward/transmit the description via multiple channels/mediums in a near-real-time. For example, based on the intelligence/policy derived by rAPP: DDSOE 225*e*, the xAPP: IRDF-CA 225*h* uses Carrier Aggregation (CA) in LTE/5G mobile networks to transmit descriptions over different carriers where, for instance, based on the estimate/prediction of the channel conditions, the base layer descriptions or subset of descriptions are sent over carriers with better coverage/signal-quality and enhancement layers or the complementary set of descriptions are sent over the other carriers. In this example, the rAPP: DDSOE 225*e* determines assigned resources and scheduling information (e.g., the carriers, and the cells, time and order of transmitting different descriptions over different carriers), and accordingly, xAPP: IRDF-CA 225*i*** forwards and transmits the packets over different carriers in near real-time.

In another example, the xAPP: IRDF-BF **225*i* use Beamforming (BF) capability of 5G mobile networks to transmit descriptions over different beams. In this example, the description importance/bit rates, beamforming weights and antenna ports are derived by rAPP: DDSOE 225*e* and received by xAPP: IRDF-BF 225*i***. Accordingly, the base layer descriptions are sent over a narrow-beam and complementary set of descriptions are sent over a wider beam.

Similarly, the xAPP: IRDF-DC **225*j* uses the Dual-Connectivity (DC) capability in 5G mobile networks to transmit different descriptions. For example, it receives the assigned resources and scheduling information from rAPP: DDSOE 225*e* and transmit base layer descriptions over a 5G portion of the mobile network and enhancement layer descriptions over a LTE portion of the mobile network. To facilitate the near real-time transmission of descriptions, the xAPP: IRDF-CA 225*h*, xAPP: IRDF-BF 225*i*, and xAPP: IRDF-DC 225*j* can use different parameters (e.g., description size/bitrate, QCI) and fields in the packet header (e.g. DSCP field in IP4/IP6) to construct forwarding rules/tables and classify, match and forward/transmit incoming packets/descriptions over different channels/mediums. To maximize the efficiency, the rAPPs and xAPPs functionalities can be developed and instantiated at the edge of the network to provide services with better efficiency and lower latency. Internal/external users and content providers 225*a* can use the information/functionalities provided by the rAPPa and xAPPs within the network domain 225*b* to optimally generate and transmit different descriptions over different channels/paths/networks of the network infrastructure 225*p***.

System 225 can include components that have not been shown to facilitate MDC. Also, all modules (e.g., software applications) and subsystems are communicating and interacting with each other via appropriate interfaces, gateways and APIs defined in the standards. Note that, system 225 is an example implementation for enabling the capability of INOC based on the currently defined standard components; however, the capability provided by the system 225 can be provided by any feature functions/modules developed by communication standard bodies.

Figure 2G:
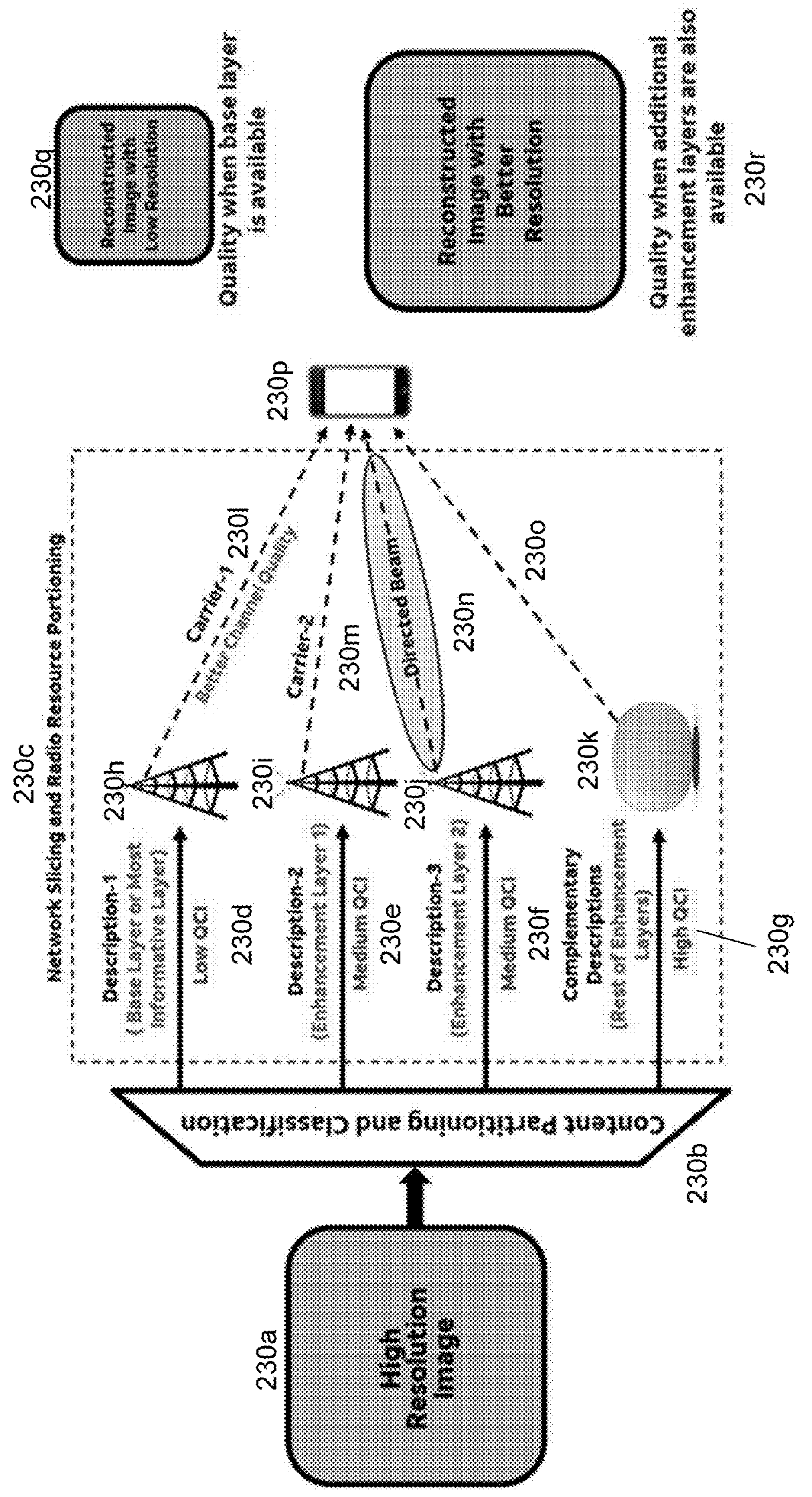

Referring to FIG. 2G, in one or more embodiments, system 230 can be implemented by one or more network devices. Further, descriptions of the source media content with different importance can be transmitted over different resource partitions in 5G mobile networks. A radio resource partition is a logically separated and self-contained part of the mobile network, that targets different services with different requirements such as different speed, latency and reliability. This characteristic of each partition can be used to define what description can be carried by different available partitions. For example, even though mmWave radio spectrum can be used for higher throughputs use cases and avoid traffic congestion, however, it is not the best option to carry base description due to its low reliability characteristics.

Each partition can carry different descriptions, for example, the base layers or enhancement layers. System 230 shows an implementation of this approach where descriptions are transmitted over different partitions of radio resources with different QoS Class Identifier (5QI). The INOC can adaptively reconfigure and manage network partitions based on different criteria such as the dynamics of the environment and available resources. The INOC can also manage and control the allocation of network partitions via APIs and other mechanisms, and by interacting with the underlying software defined network controller. In one embodiment, DSCP values in the IP packet headers can be used to distinguish and transmit base layers and enhancement layers descriptions over different partitions and network paths.

In one or more embodiments, source media content **230*a* can be provided to the content partitioning and classification function 230*b* of an INOC implemented by one or more software applications. The source media content can comprise different descriptions that can include first description 230***d*, which is a base layer, a second description 230*e*, which is an enhancement layer, a third description 230*f*, which is an enhancement layer, and a complimentary descriptions 230*g*, which are the rest of the enhancement layers. The INOC can implement network slicing and radio resource portioning 230*c*. This can include transmitting the first description 230*d* having a low QCI via base station 230*h* over a first carrier 2301 to communication device 230*p*, transmitting the second description 230*e* having a medium QCI via base station 230*i* over a second carrier 230*m* to communication device 230*p*, transmitting the third description 230*f* having a medium QCI via base station 230*j* over a directed beam 230*n* to communication device 230*p*, and transmitting the complimentary descriptions 230*g* having a high QCI via WiFi gateway 230*k* over a wireless communication link 2300 to communication device 230*p*. Further, communication device 230*p* can reconstruct source media content 230*q* when the base layer is available and reconstruct source media content 230*r* when additional enhancement layers are also available.

To facilitate the creation of descriptions and defining resource partitions, the user/agent request can be interpreted using Generative-AI (Gen-AI) or large language models (LLMs). Accordingly, the user/agent request can be automatically and intelligently converted to codes/instructions/guidance for creating partitions of resources that carry different descriptions. The developing of Gen-AI models in the INOC or DDSOE can be accomplished using internal/external data/documents and in different ways such as fine-tuning of a pre-trained model, retrieval-augmented generation (RAG) and reinforcement learning using feedback.

Figure 2H:
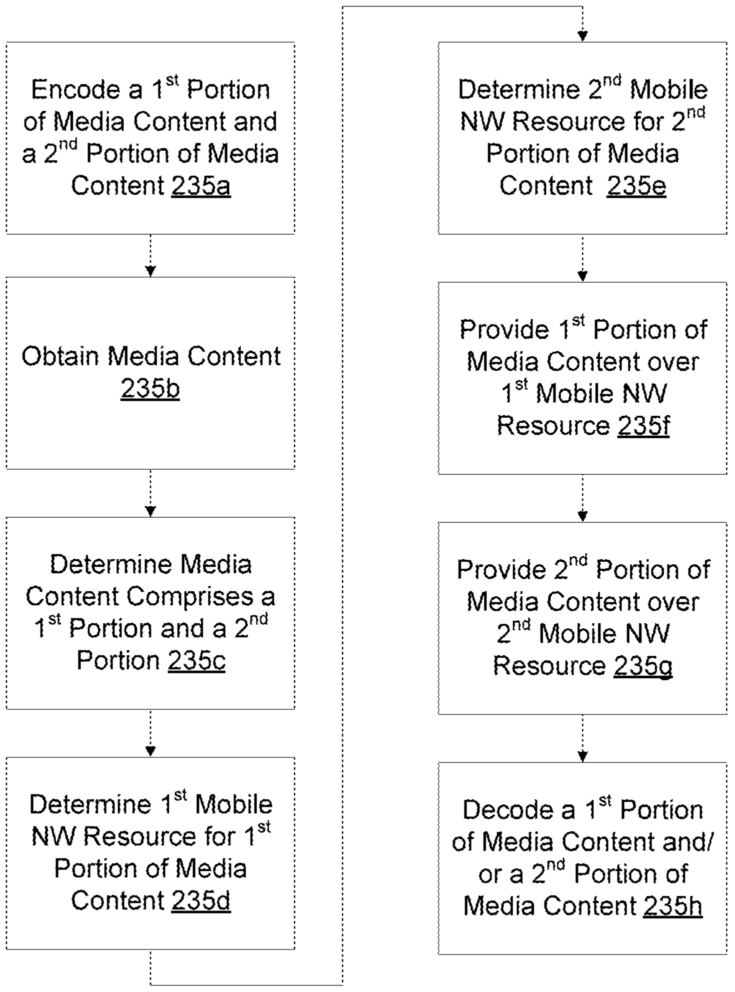
FIG. 2H depicts an illustrative embodiment of a method in accordance with various aspects described herein.

FIG. 2H depicts an illustrative embodiment of a method 235 in accordance with various aspects described herein. Aspects of the method 300 can be implemented by a communication device (e.g., user equipment), media content source provider system that includes one or more computer systems and/or databases, one or more network devices that implement aspects of system 210, aspects of system 225, and/or aspects of system 230. In one or more embodiments, method 300 can include the media content source provider system, at 235*a*, encoding a first portion of the media content and encoding a second portion of the media content. The media content source provider system encodes the first portion of the media content utilizing multiple description coding (MDC), and the media content source provider system encodes the second portion of the media content utilizing MDC. The first portion of the media content is encoded into a first description, and the second portion of the media content is encoded into a second description. Further, the first portion of the media content is encoded into a base layer description, and the second portion of the media content is encoded into an enhancement layer description.

In one or more embodiments, the method 300 can include the one or more network devices, at 235*b*, obtaining media content from the media content source (e.g., media content provider system) over a mobile communication network. Further, the method 300 can include the one or more network devices, at 235*c*, determining that the media content comprises the first portion of the media content and the second portion of the media content. In addition, the method 300 can include the one or more network devices, at 235*d*, determining a first mobile network resource for communicating the first portion of the media content utilizing a machine learning and artificial intelligence application. Also, the method 300 can include the one or more network devices, at 235*e*, determining a second mobile network resource for communicating the second portion of the media content utilizing the machine learning and artificial intelligence application.

In one or more embodiments, the method 300 can include the one or more network devices, at 235*f*, providing the first portion of the media content to a communication device utilizing the first mobile network resource. Further, the method 300 can include the one or more network devices, at 235*g*, providing the second portion of the media content to the communications device utilizing the second mobile network resource. In addition, the method 300 can include the communication device, at 235*h*, decoding at least one of the first portion of the media content according to the first description or the second portion of the media content according to the second description. In some embodiments, the communication device decodes at least of one of the first portion of the media content according to the base layer description or the second portion of the media content according to the enhancement layer description.

In one or more embodiments, the first mobile network resource is one of frequency channel, time slot, spread spectrum code, narrow beam, a wide beam, a carrier aggregation resource, a 5G resource, a Long Term Evolution (LTE) resource, a network slice, or a combination thereof. Further, the second mobile network resource is one of frequency channel, time slot, spread spectrum code, narrow beam, a wide beam, a carrier aggregation resource, a 5G resource, a LTE resource, a network slice, or a combination thereof.

In one or more embodiments, the determining of the first mobile network resource comprises utilizing a description diversify scheduling and optimization engine software application within a distributed radio access network (RAN). Further, the determining of the second mobile network resource comprises the description diversify scheduling and optimization engine software application within the distributed RAN.

In one or more embodiments, the determining of the first mobile network resource comprises utilizing a non-real-time RAN intelligent controller. Further, the determining of the second mobile network resource comprises utilizing the non-real-time RAN intelligent controller.

In one or more embodiments, the determining of the first mobile network resource comprises utilizing a group of rApplications associated with the non-real-time RAN intelligent controller. Further, the determining of the second mobile network resource comprises utilizing the group of rApplications associated with the non-real-time RAN intelligent controller.

In one or more embodiments, the determining of the first mobile network resource comprises utilizing a near real-time RAN intelligent controller. Further, the determining of the second mobile network resource comprises utilizing the near real-time RAN intelligent controller.

In one or more embodiments, the determining of the first mobile network resource comprises utilizing a group of xApplications associated with the near real-time RAN intelligent controller. Further, the determining of the second mobile network resource comprises utilizing the group of xApplications associated with the near real-time RAN intelligent controller.

In one or more embodiments, the diversify scheduling and optimized engine can be generated based on first data from a group of internal data sources and second data from a group of external data sources utilizing one or more machine learning and artificial intelligence techniques.

In one or more embodiments, an information/content partitioning and classification (ICPC) software application in conjunction with the diversify scheduling and optimization engine software application determines a description associated with the first portion of media content based on at least one of header packet information associated with the media content and determines the first mobile network resource and the second mobile network resource.

In one or more embodiments, the one or more network devices can determine a description of the first portion of the media content and the first mobile network resource utilizing Generative-AI.

In one or more embodiments, the media content comprises a group of portions. The first portion of the group of portions associated with the media content is associated with a base layer description. A plurality of portions of the group of portions associated with the media content is associated with multiple enhancement layer descriptions. Further, the one or more network devices can determine a mobile network resource for each of the plurality of portions of the group of portions associated with the media content, and provide each of the plurality of portions of the group of portions associated with the media content to the communication devices over a respective mobile network resource.

While for purposes of simplicity of explanation, the respective processes are shown and described as a series of blocks in FIG. 2H, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. In some embodiments, one or more blocks can be performed in response to one or more other blocks.

Portions of some embodiments can be combined with portions of other embodiments.

Figure 3:
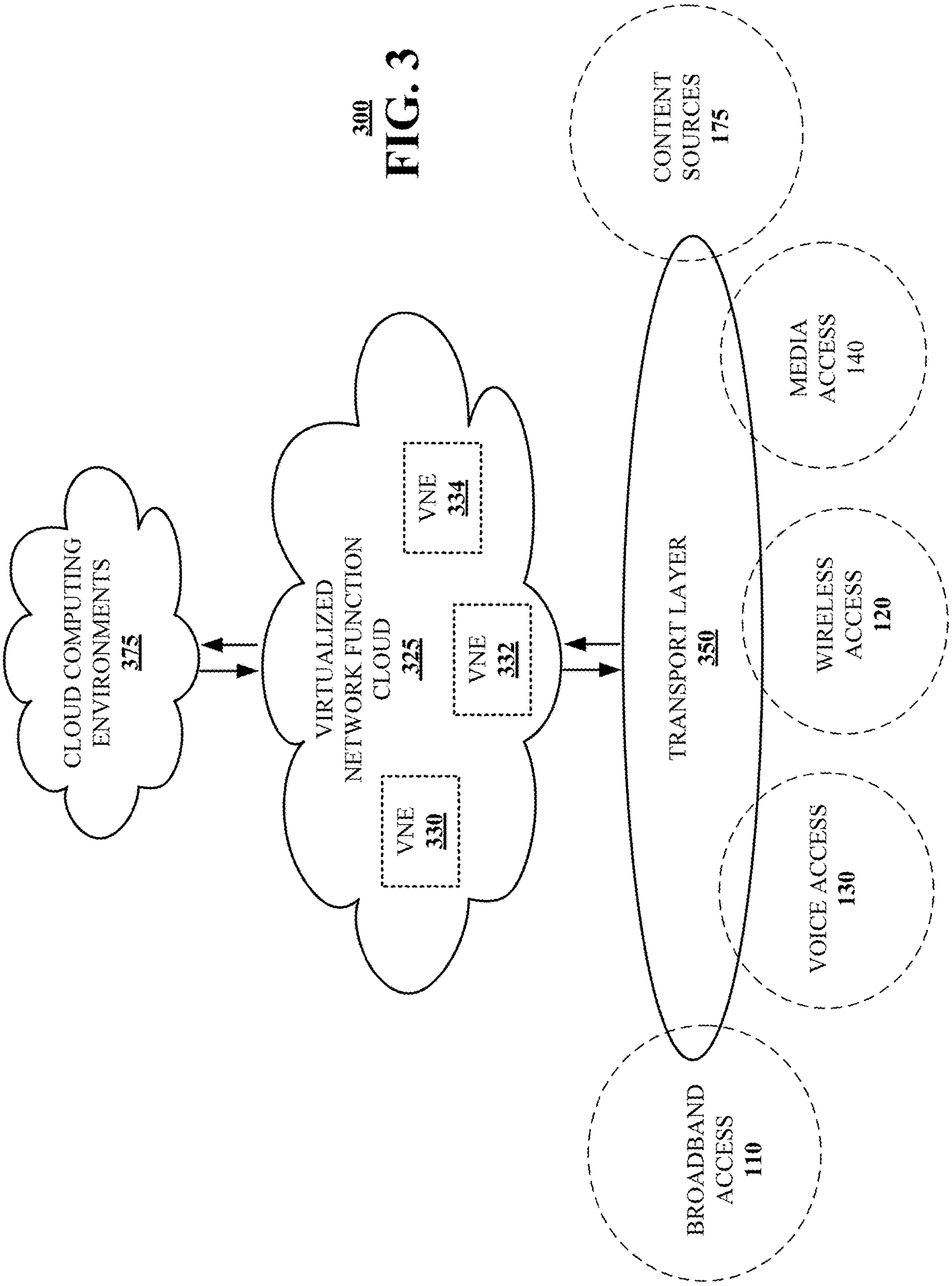
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, system 205, system 210, system 215, system 220, system 225, system 230 and method 235 presented in FIGS. 1, 2A-2H, and 3. For example, virtualized communication network 300 can facilitate in whole or in part enabling mobile networks to select mobile network resources based on multiple description coding of media content.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
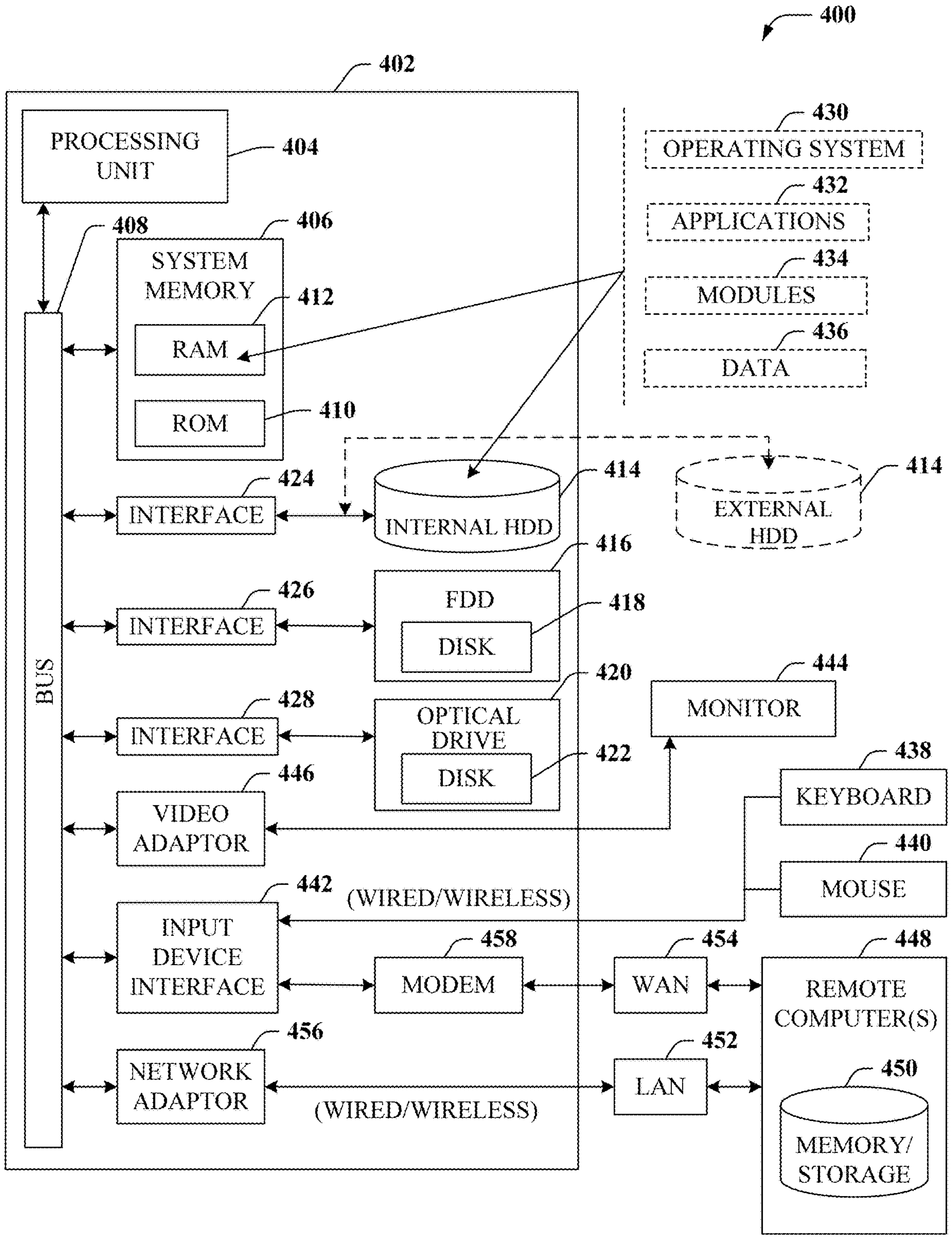
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part enabling mobile networks to select mobile network resources based on multiple description coding of media content. Further, source 200*a*, one or more network devices that comprise system 200, receiver 200*p*, source 205*a*, one or more network devices that comprise system 205, user communication device 2050, one or more computer systems associated with external content providers 210*w*, one or more computer systems associated with external data sources 2101, one or more network devices that comprise system 210, communication device 210*b*, base station 215*c*, communication device 215*a*, communication device 215*b*, base station 220*b*, base station 220*d*, communications device 220*a*, one or more computer systems associated with content providers 225*a*, one or more network devices that comprise system 225, communication devices associated with system 225 can comprise computing environment 400.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms “tangible” or “non-transitory” herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term “modulated data signal” or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
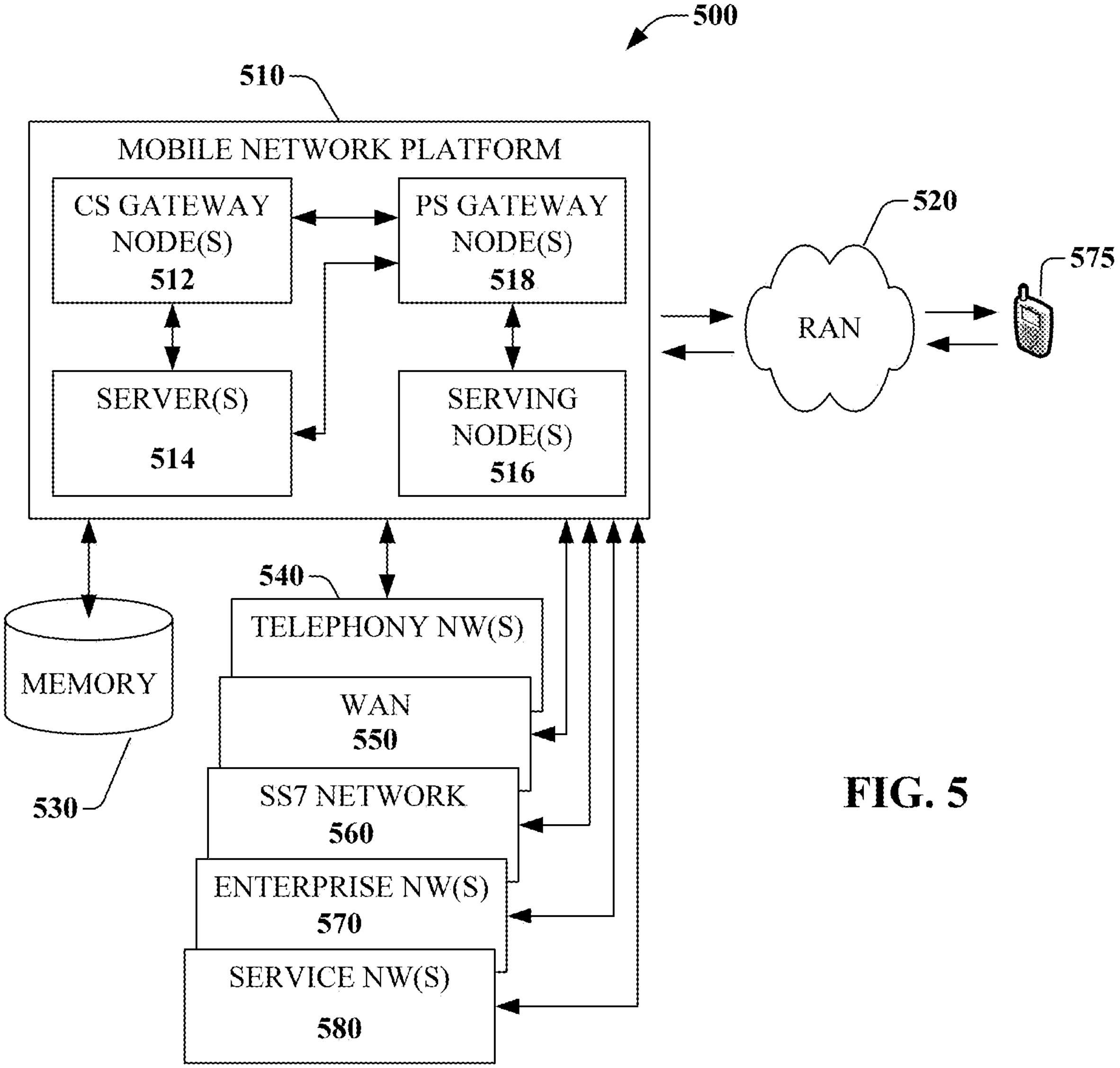
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part enabling mobile networks to select mobile network resources based on multiple description coding of media content. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flatrate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
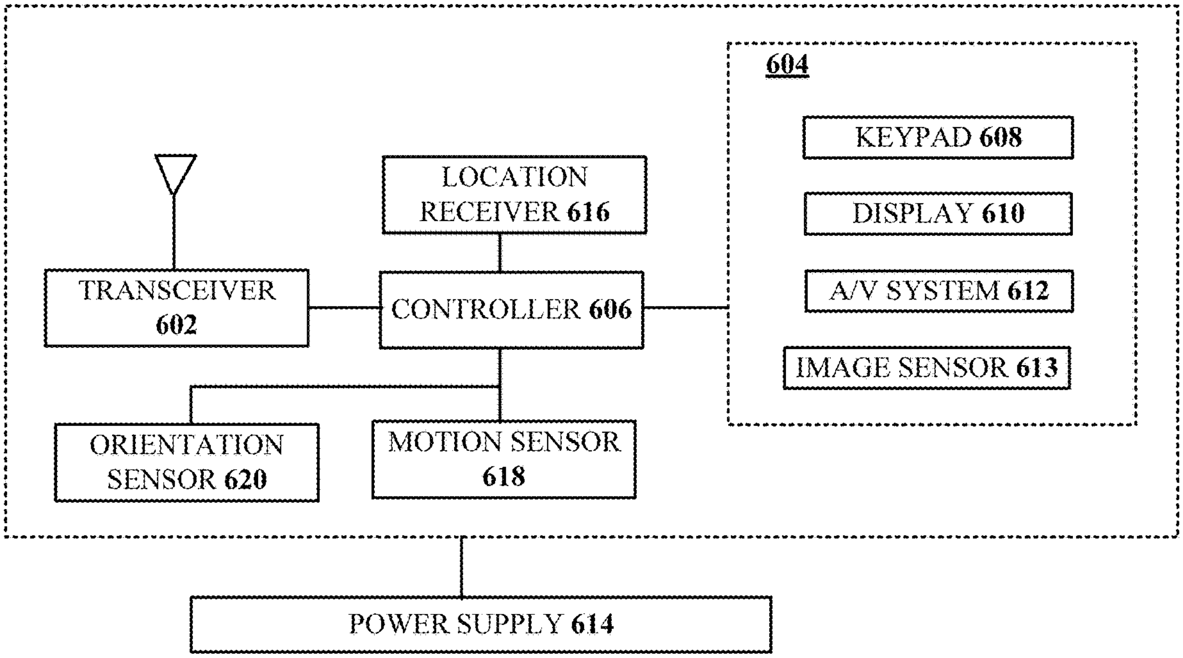
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, communication device 600 can facilitate in whole or in part enabling mobile networks to select mobile network resources based on multiple description coding of media content. Further, source 200*a*, one or more network devices that comprise system 200, receiver 200*p*, source 205*a*, one or more network devices that comprise system 205, user communication device 2050, one or more computer systems associated with external content providers 210*w*, one or more computer systems associated with external data sources 2101, one or more network devices that comprise system 210, communication device 210*b*, base station 215*c*, communication device 215*a*, communication device 215*b*, base station 220*b*, base station 220*d*, communications device 220*a*, one or more computer systems associated with content providers 225*a*, one or more network devices that comprise system 225, communication devices associated with system 225 can comprise communication device 600.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)=\text{confidence}(\text{class})$. Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, facilitate performance of operations, the operations comprising:

obtaining media content from a media content source over a mobile communication network;

determining that the media content comprises a first portion of the media content and a second portion of the media content;

determining a first mobile network resource for communicating the first portion of the media content utilizing a machine learning and artificial intelligence application;

determining a second mobile network resource for communicating the second portion of the media content utilizing the machine learning and artificial intelligence application;

providing the first portion of the media content to a communication device utilizing the first mobile network resource; and providing the second portion of the media content to the communications device utilizing the second mobile network resource.

2. The device of claim 1, wherein the media content source encodes the first portion of the media content, wherein the media content source encodes the second portion of the media content.

3. The device of claim 2, wherein the media content source encodes the first portion of the media content utilizing multiple description coding (MDC), wherein the media content source encodes the second portion of the media content utilizing MDC.

4. The device of claim 3, wherein the first portion of the media content is encoded into a first description, wherein the second portion of the media content is encoded into a second description.

5. The device of claim 4, wherein the communication device decodes at least one of the first portion of the media content according to the first description or the second portion of the media content according to the second description.

6. The device of claim 4, wherein the media content comprises a group of portions, wherein the first portion of the group of portions associated with the media content is associated with a base layer description, wherein a plurality of portions of the group of portions associated with the media content is associated with multiple enhancement layer descriptions, wherein the operations comprises:

determining a mobile network resource for each of the plurality of portions of the group of portions associated with the media content; and providing each of the plurality of portions of the group of portions associated with the media content to the communication devices over a respective mobile network resource.

7. The device of claim 1, wherein the first mobile network resource is one of frequency channel, time slot, spread spectrum code, narrow beam, a wide beam, a carrier aggregation resource, a 5G resource, a Long Term Evolution (LTE) resource, a network slice, or a combination thereof, and wherein the second mobile network resource is one of frequency channel, time slot, spread spectrum code, narrow beam, a wide beam, a carrier aggregation resource, a 5G resource, a LTE resource, a network slice, or a combination thereof.

8. The device of claim 1, wherein the determining of the first mobile network resource comprises utilizing a description diversify scheduling and optimization engine software application within a distributed radio access network (RAN), wherein the determining of the second mobile network resource comprises utilizing the description diversify scheduling and optimization engine software application within the distributed RAN.

9. The device of claim 8, wherein the diversify scheduling and optimized engine is generated based on first data from a group of internal data sources and second data from a group of external data sources utilizing one or more machine learning and artificial intelligence techniques.

10. The device of claim 8, wherein an information/content partitioning and classification (ICPC) software application in conjunction with the diversify scheduling and optimization engine software application determines a description associated with the first portion of media content based on at least one of header packet information associated with the media content and determines the first mobile network resource and the second mobile network resource.

11. The device of claim 1, wherein the operations comprise determining a description of the first portion of the media content and the first mobile network resource utilizing Generative-AI.

12. The device of claim 1, wherein the determining of the first mobile network resource comprises utilizing a non-real-time RAN intelligent controller, wherein the determining of the second mobile network resource comprises utilizing the non-real-time RAN intelligent controller.

13. The device of claim 12, wherein the determining of the first mobile network resource comprises utilizing a group of rApplications associated with the non-real-time RAN intelligent controller, wherein the determining of the second mobile network resource comprises utilizing the group of rApplications associated with the non-real-time RAN intelligent controller.

14. The device of claim 1, wherein the determining of the first mobile network resource comprises utilizing a near real-time RAN intelligent controller, wherein the determining of the second mobile network resource comprises utilizing the near real-time RAN intelligent controller.

15. The device of claim 14, wherein the determining of the first mobile network resource comprises utilizing a group of xApplications associated with the near real-time RAN intelligent controller, wherein the determining of the second mobile network resource comprises utilizing the group of xApplications associated with the near real-time RAN intelligent controller.

16. A non-transitory machine-readable medium, comprising executable instructions that, when executed by a processing system including a processor, facilitate performance of operations, the operations comprising:

obtaining media content from a media content source over a mobile communication network;

determining that the media content comprises a first portion of the media content encoded according to a first description and a second portion of the media content encoded according to a second description;

determining a first mobile network resource for communicating the first portion of the media content utilizing a machine learning and artificial intelligence application;

determining a second mobile network resource for communicating the second portion of the media content utilizing the machine learning and artificial intelligence application;

providing the first portion of the media content to a communication device utilizing the first mobile network resource; and providing the second portion of the media content to the communications device utilizing the second mobile network resource.

17. The non-transitory machine-readable medium of claim 16, wherein the first description comprises a base layer description, wherein the second description comprises an enhancement layer description.

18. The non-transitory machine-readable medium of claim 16, wherein the determining of the first mobile network resource comprises utilizing a non-real-time RAN intelligent controller, wherein the determining of the second mobile network resource comprises utilizing the non-real-time RAN intelligent controller.

19. The non-transitory machine-readable medium of claim 16, wherein the determining of the first mobile network resource comprises utilizing a near real-time RAN intelligent controller, wherein the determining of the second mobile network resource comprises utilizing the near real-time RAN intelligent controller.

20. A method, comprising:

obtaining, by a processing system including a processor, media content from a media content source over a mobile communication network;

determining, by the processing system, that the media content comprises a first portion of the media content encoded according to a base layer description and a second portion of the media content encoded according to an enhancement layer description;

determining, by the processing system, a first mobile network resource for communicating the first portion of the media content utilizing a machine learning and artificial intelligence application;

determining, by the processing system, a second mobile network resource for communicating the second portion of the media content utilizing the machine learning and artificial intelligence application;

providing, by the processing system, the first portion of the media content to a communication device utilizing the first mobile network resource; and providing, by the processing system, the second portion of the media content to the communications device utilizing the second mobile network resource.

* * * * *